United States Patent [19]

Shah et al.

[11] 4,064,288
[45] Dec. 20, 1977

[54] METHOD FOR REGISTERING ANODE AND CATHODE LAYERS ON A WEB

[75] Inventors: Hemendra K. Shah, Leominster; William G. Turner, North Tewksbury, both of Mass.

[73] Assignee: Vertipile, Inc., Leominster, Mass.

[21] Appl. No.: 666,083

[22] Filed: Mar. 11, 1976

[51] Int. Cl.$^2$ .............................................. H01M 6/40
[52] U.S. Cl. ..................................... 427/58; 427/123;
427/126; 427/210; 427/211; 427/346; 427/296;
427/256; 427/428; 118/211; 118/212; 118/224;
429/152; 429/162; 29/623.3
[58] Field of Search ................ 29/623.3; 429/152, 162;
427/209, 379, 380, 428, 256, 287, 288, 210, 211,
428, 58, 123, 126, 346, 296; 118/204, 212, 211,
224

[56] References Cited

U.S. PATENT DOCUMENTS

| | | | |
|---|---|---|---|
| 2,094,348 | 9/1937 | Carlson | 427/428 |
| 3,019,130 | 1/1962 | Horbostel | 427/296 |
| 3,694,268 | 9/1972 | Bergum | 29/623.3 |
| 3,701,690 | 10/1972 | Dermody et al. | 29/623.3 |
| 3,704,164 | 11/1972 | Travis | 427/96 X |
| 3,740,270 | 6/1973 | Bilhorn | 429/162 X |
| 3,784,406 | 1/1974 | Kosta et al. | 427/256 X |

Primary Examiner—Ralph S. Kendall
Attorney, Agent, or Firm—Pearson & Pearson

[57] ABSTRACT

An apparatus and method for making continuous, elongated strips or webs, of electrically conductive, flexible material having individual and successive deposits, or patches, spaced apart therealong, each deposit comprising a cathode layer on one face of the strip, oppositely disposed to an anode layer on the other face of the strip, characterized by the layers being in exact peripheral registration with each other.

The registration is obtained by reverse roll coating a first such layer on the advancing strip in a first zone so that it extends above the surface of the strip, then training the advancing strip around a roll, in a coating roll nip, with the first layer down and supported on the roll surface and simultaneously reverse roll coating the second such layer on the exposed face of the strip in said nip, while the portions thereof surrounding the raised first layer are flexed out of the plane of the strip, thereby permitting the first layer to control the deposit of the second layer to register therewith.

10 Claims, 4 Drawing Figures

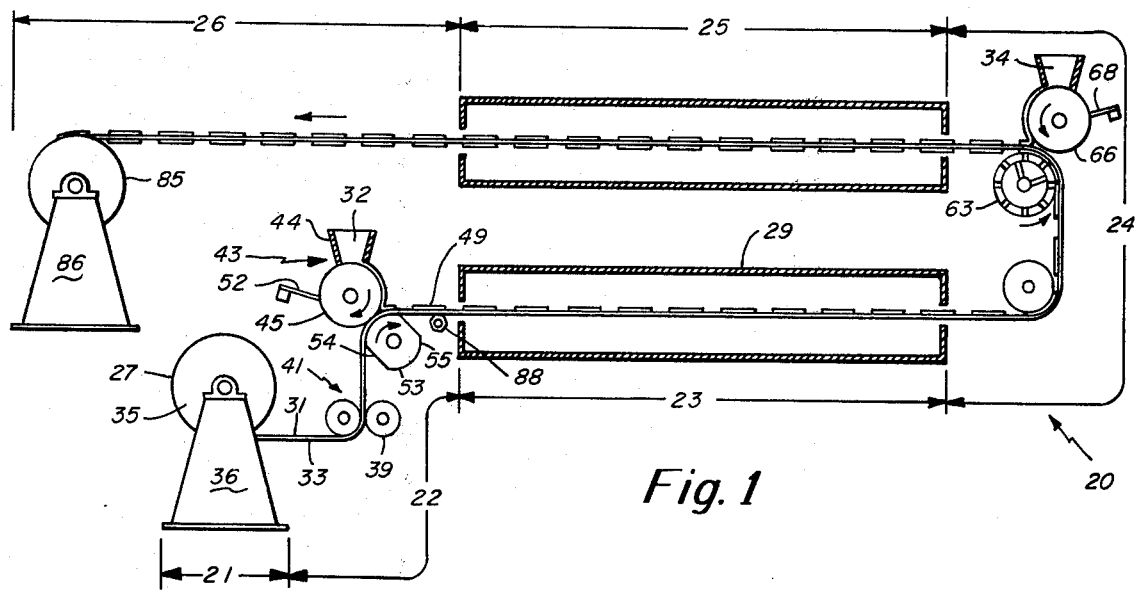
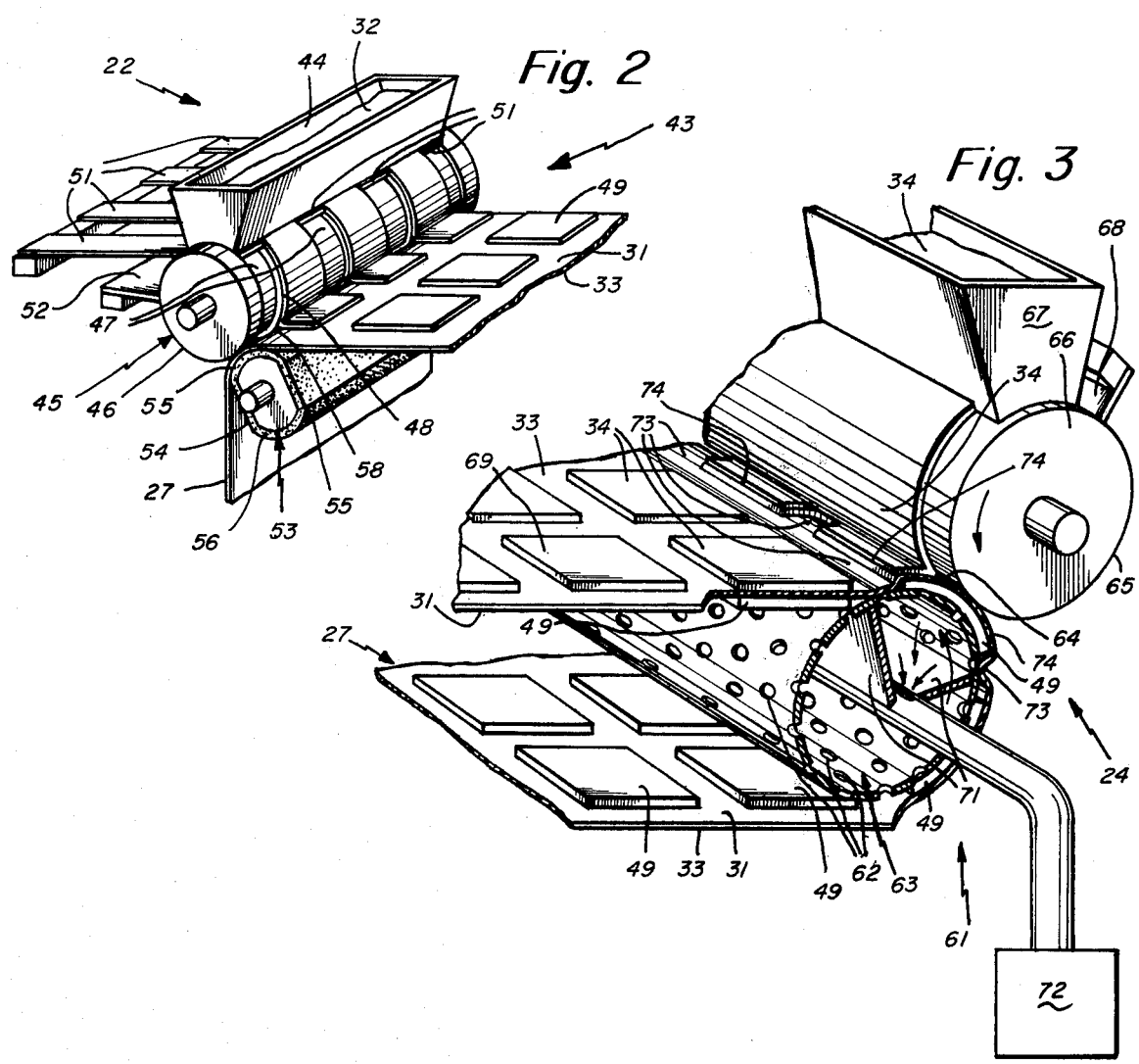

METHOD FOR REGISTERING ANODE AND CATHODE LAYERS ON A WEB

BACKGROUND OF THE INVENTION

It has long been known to make wafer type batteries for use in cameras or the like by applying spaced apart, oppositely disposed layers of anode and cathode material along an electrically conductive web and cutting the web transversely for forming such batteries.

Typical of such devices are the multicell batteries disclosed in U.S. Pat. No. 3,694,268 of Sept. 26, 1972 and U.S. Pat. No. 3,674,565 of July 4, 1972, both to Bergum and in U.S. Pat. No. 3,701,690 of Oct. 31, 1972 to Dermody. In these patents the electrode applicators are stated to represent such applicators in general and no preferred means for obtaining exact registration of the oppositely disposed electrodes is disclosed.

SUMMARY OF THE INVENTION

It has been found, however, in the manufacture of such batteries, not only to commercial standards but to the strict acceptable standards of Polaroid Corporation of Cambridge, Massachusetts, which is a principal user thereof, that the anode layer must be in exact registration with the cathode layer, to minimize short circuiting.

In this invention the roll of electrically conductive plastic, or other substrate, is first supplied with an electric eye target in a printing zone and the web is then advanced through a reverse roll coating zone for the application of a manganese aqueous slurry cathode layer in a precisely predetermined pattern, by a hard faced reverse coating roll opposed by a resilient faced backing roll.

The cathode layer is dried in a drying zone and the web then turned back upon itself to bring the uncoated face to the top. In a second reverse roll coating zone the web is supported by contact of the spaced cathode deposits on the apertured surface of a suction roll, which draws the web out of its plane around the cathode deposit while a hard faced reverse coating roll applies a layer of zinc slurry anode material in exact registration with the cathode deposit.

Thereafter the anode layer is dried and the web interfaced with a slip sheet and wound up.

BRIEF DESCRIPTION OF THE DRAWING

FIG. 1 is a diagrammatic side elevation showing the steps of the method of the invention;

FIG. 2 is a fragmentary perspective view of the first reverse roll coating means of the invention;

FIG. 3 is an enlarged, fragmentary perspective, view, partly in section, showing the web distorted out of its normal plane by fluid pressure to raise the portion upon which the anode layer is to be deposited

DESCRIPTION OF A PREFERRED EMBODIMENT

Figure 4:
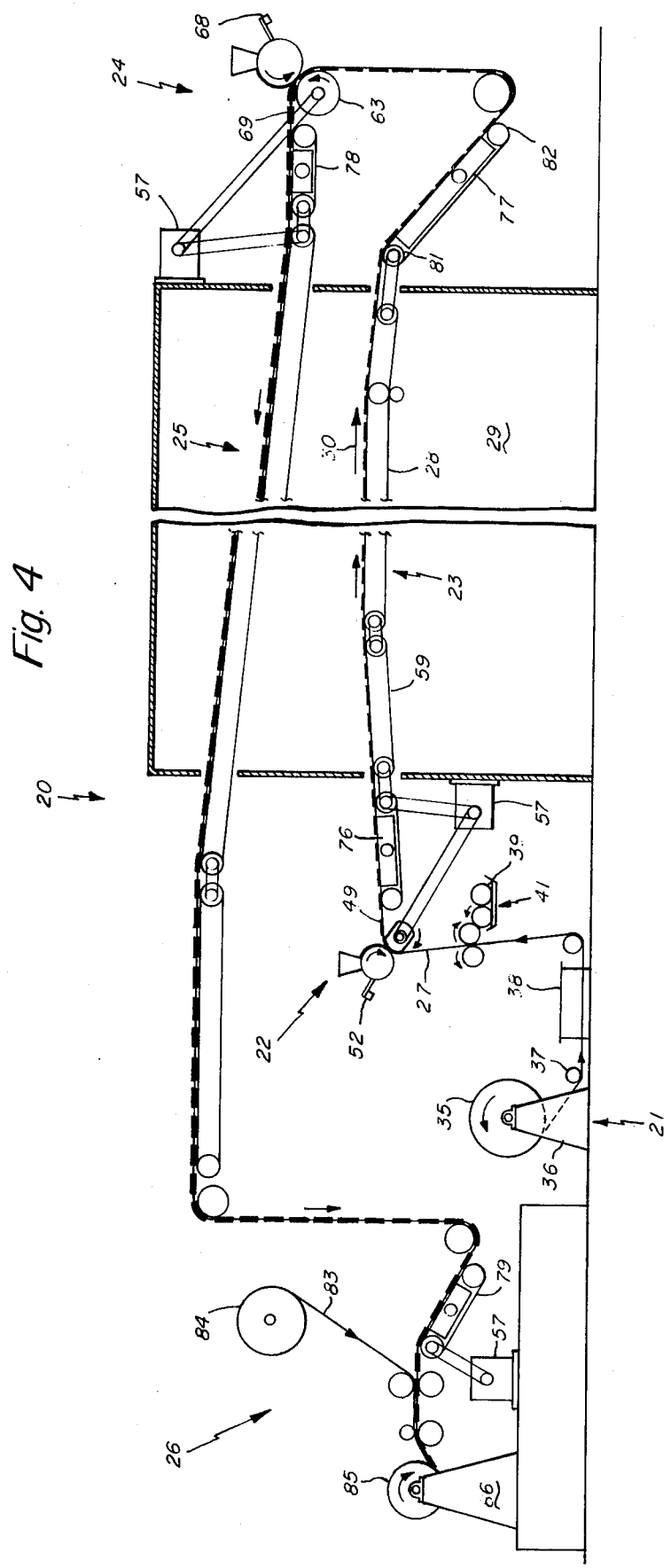
FIG. 4 is a side elevation of an embodiment of the entire system.

As shown in the drawings, the coating and registering apparatus 20 of the invention includes a web supply zone 21, a first roll coating zone 22, a first drying zone 23, a second roll coating zone 24, a second drying zone 25 and a web wind-up zone 26, the electrically conductive web 27 being advanced along a path through said zones by suitable power means such as the motor driven endless conveyor 28 in the dryer 29.

The continuous elongated web, or strip, 27 of electrically conductive material is vinyl film preferably of Condulon L-4636 made by Pervel Industries but it may be any other suitable, flexible substrate. The web 27 has a shiny side, or face, 31, to which the cathode slurry 32 is applied and a dull side, or face, 33, to which the anode slurry 34 is applied. The roll 35 of web 27 is mounted in a suitable roll stand 36 in web supply zone 21 and is trained under guide rolls 37 and under a let-off guide and operator platform 38, along path 30, preferably first through a print station 39 (FIG. 4). Print station 39 includes a set of printing, transfer and back up rolls indicated generally at 41 for applying an electric eye target in ink on the anode face 33 of web 27 used as a marker in later assembly and interleaving of the multi cell batteries to be made from the continuous web product of this invention.

The electrically conductive web 27 is flexible and is normally planar as it is advanced along path 30, by being supported on conveyors or rolls and drawn taut but it can be distorted slightly out of its normal plane by fluid pressure without fracture or permanent distortion. It is about 0.0018 – 0.002 inches in thickness.

In the first roll coating zone 22, the web 27 is advanced through first reverse roll coating means 43, which includes a suitable fountain 44 containing a positive, cathode aqueous slurry 32 of about 70% manganese dioxide and 30% water. The applicator roll 45 has a hard surface 46, with a plurality of longitudinally spaced, circumferentially extending grooves 47, defining a plurality of circumferential printing areas 48, whereby a plurality of side-by-side deposits 49 can be made in a single run. A plurality of spaced fingers 51 are provided, each occupying one of the grooves 47 to keep the groove clear of coating and doctor blades 52 may be provided to remove excess coating. The deposit 49 is about 8 mils thick of $MNO_2$, about 2.6 inches long and about 2.07 inches wide. The coating means 43 also includes a backing roll 53 preferably having alternate flat chordal faces 54 and curved faces 55, with a resilient, sleeve covering 56. The rolls 45 and 53 are driven by suitable power means 57 and the roll 45 is reversely rotated to cause the surface 46 to travel in the opposite direction to the upper, shiny face 31 of web 27 to deposit a layer of accurately controlled thickness, each time a curved face 55 forms a coating nip 58 with a face 46.

The continuous web, or film, 27, with its longitudinally spaced apart, positive electrode deposits 49 accurately reverse roll coated in a predetermined pattern on the shiny, upper, face 31 is then advanced along path 30 through the first drying zone 23 at about eighteen feet per minute while supported and controlled by the powered endless belt conveyors 28 or 59, driven by power means 57, the drying oven 29 being maintained at about 120° – 130° F by suitable heating means not shown and well known such as infrared bulbs, gas flame, steam or the like.

The web 27 is then turned back upon itself to advance through the second roll coating zone 24 with the shiny, upper face 31 becoming the underface and with the dried cathode deposits 49 facing downwardly to contact the apertured surface 62 of a hard faced suction roll 63 of second roll coating means 61. Suction roll 63 forms a coating nip 64 with the hard, ungrooved coating face 65 of a coating applicator roll 66, the roll 66 being reversely rotated to deposit a layer of negative electrode slurry 34 on the dull face 33 of web 27.

Second reverse roll coating means 61 includes a suitable fountain 67 containing the anode aqueous slurry 34 of about 90% zinc and 10% water (Zn) there being a blade 68 and a drive connection, not shown, to power drive means 57 to rotate the hard surface 63 in a direction opposite to the direction of travel of face 33 of web 27 thereby reverse roll depositing an accurate thickness of anode slurry in a predetermined pattern 69 about 2.46 inches in length, 1.86 inches in width and 1.75 mils in thickness.

The apertured suction surface 62 of suction roll 63 supports and contacts each individual and successive dried cathode deposit 49 while suction is exerted through the apertures 62 by means of a suitable suction box 71, deckles and suction supply 72 such as mill suction or a vacuum pump. The normally planar web, or film 27, in the areas 73 encompassing the down facing cathode deposits 49 are thus drawn out of the plane of the web and downwardly away from the reverse roll coating surface 65 at the coating nip 64.

It will thus be seen that each successive anode deposit 69 is accurately registered on one of the individual and successive raised areas 74 of the dull face 33 of web 27 as that portion 74 passes through reverse roll coating nip 64 and that no deposit is made on the areas 73 which are distorted out of the plane by a distance of at least 8 mils. Thus it is the pattern of each cathode deposit 49 which creates an identical pattern 69 of anode deposit for substantially perfect registration. Preferably the anode pattern 69 is of slightly reduced dimensions relative to the corresponding dimensions of cathode pattern deposits 49.

To better control the speed and accuracy of travel of web 27 along path 30, suction belts 76, 77, 78 and 79 are provided each being trained on pulleys 81 or 82 and being connected to a suction source such as 72. The suction belts are positively driven from drive means 57 at predetermined speeds to assure that web 27 is under accurate speed control and to control tension and tautness of the web especially in the drying oven 29.

The web 27 advances along path 30 through second drying zone 25, which is preferably a reverse run through the oven, with the anode deposits drying on the face 33 prior to arrival in wind up zone 26 in which the web 27 may be interfaced with a "Mylar" slip sheet 83, supplied from roll 84 before wind up on roll 85 on stand 86.

A rotating beater bar 88, of hexagonal cross section, or other suitable vibration means is preferably mounted along the path 30, between zones 22 and 23 to smooth the exposed surface of cathode deposit 49 prior to drying.

While the coating rolls of the invention are shown with relatively large diameters in the drawings, it should be understood that the applicator roll 45 is preferably about 2.5 inches in diameter, the printing area surfaces are about 2 inches in longitudinal dimension, the grooves 47 are about 0.75 inches in longitudinal dimension and the grooves 47 are about 1/16 inch deep. The flat faces 54 of backing roll 53 are about 1.02 inches in circumferential length while the curved faces 55 are about 2.4 inches in circumferential length. Similarly the diameter of the reverse roll coating roll 66 is about 2½ inches and the suction roll 63 is about 3 inches in diameter with the apertured surface 62 being about forty mesh to the inch.

While it would be possible to use a positive air pressure to blow the areas 73 out of the plane of web 27, suction is preferred to avoid the possibility of spattering or spreading of the slurry unless numerous baffles were used.

It is also possible that web tension alone exerted by the suction belt 78 on the web or film 27 from in rear of the coating nip 64 and exerted by the suction belt 77 on the web or film 27 from in advance of the coating nip 64 will pull the web to flex or distort it out of its normal plane while the anode patch 69 is registered on the face of the web supported on cathode patch 49 but suction is preferred for the purpose to avoid undue stretch or fracture of the film.

We claim:
1. A method for continuously making a continuous strip of spaced apart, oppositely disposed cathode and anode deposits, from slurries thereof, said method comprising the steps of:
   advancing a continuous web of electrically conductive sheet material along a path through a coating nip in a first coating zone, a first drying zone, a coating nip in a second coating zone and a second drying zone;
   depositing a plurality of individual and successive deposits of cathode slurry in a predetermined pattern on one face of said web in said first coating zone, the pattern of said cathode deposits being raised out of the plane of said web;
   drying said cathode deposits in said first drying zone;
   supporting said advancing web in said coating nip in said second coating zone by contact only with the said raised cathode deposit while flexing the portion of said web around said deposit away from the normal plane of said web,
   while so supporting said web in said coating nip, simultaneously reverse roll coating a deposit of anode slurry, on the other face of said web, individually and successively on the area of said web defined by the predetermined pattern of said cathode deposit, free of any deposit on the portions flexed out of the normal plane of said web in said coating nip, and then drying said anode deposits in said second drying zone.

2. A method as specified in claim 1 wherein:
   said step of advancing said web along said path includes the step of maintaining tension in said web by adhering spaced sections thereof to at least one suction conveyor advancing at a controlled speed along a portion of said path.

3. A method as specified in claim 1 wherein:
   said depositing step in said first coating zone is accomplished by reverse roll applying a layer of positive electrode slurry on one face of said advancing web while the other face is backed up by a resilient faced back up roll in a coating nip.

4. A method as specified in claim 1 plus the step of:
   vibrating said web, and each individual and successive cathode deposit thereon, while said web is advancing from said first coating zone to said first drying zone to create a smooth, even exposed surface on said cathode deposit prior to drying the same.

5. A method as specified in claim 1 wherein
   said step of supporting said advancing web in said second coating zone by contact with said raised cathode deposit includes the step of supporting the same on the hard apertured surface of a suction roll, and the step of exerting fluid pressure on said web includes the step of creating suction within said roll to pull the portions of said web around said cathode deposits, against said roll surface and out of the plane of said web.

6. A method for accurately registering individual and successive anode deposits on one face of an advancing web with individual and successive cathode deposits on the opposite face of said web by means of a nip formed by a coating roll and an apertured surface which comprises the steps of:

advancing a continuous flexible elongated web, bearing longitudinally spaced apart, individual, successive dried cathode deposits, through said nip with the cathode deposits under the web and supported on said apertured surface;

exerting suction through said apertured surface in advance of, at, and in rear of said nip to pull said advancing web downwardly out of its normal plane in the portions extending around each said cathode deposit;

and, while said web is so pulled out of its normal plane, reverse roll coating a plurality of individual and successive deposits of anode slurry from said coating roll in said nip on the exposed face of said web each registering substantially exactly with the pattern and periphery of the individual and successive cathode deposits on the under face of said web and then drying said anode slurry deposits.

7. A method as specified in claim 6 wherein said suction step includes the step of rotating said apertured surface with said web by supporting the same as a roll.

8. A method as specified in claim 6 wherein said suction step includes the step of supporting said cathode deposits on an apertured roll surface of about 40 mesh to an inch and reverse roll coating said anode deposit from a roll surface selected to coat a pattern of slightly reduced dimensions relative to the pattern of said cathode deposit.

9. A method for continuously making continuous, elongated webs of electrically conductive, flexible material having individual and successive deposits spaced therealong, each deposit comprising a cathode layer on one face of the web and an anode layer on the opposite face of the web, said cathode and anode layers being in substantially exact peripheral registration with each other:

by means of a smooth faced coating roll forming a coating nip with the apertured face of a suction roll;

said method comprising the steps of;

advancing a web of predetermined thickness along a path up to and through said nip with one said layer deposited on one said surface thereof in individual and successive, spaced apart, dried deposits of predetermined thickness;

supporting said one surface of said web, and the said dried deposits thereon, on the apertured face of said suction roll at said nip while exerting suction thereon to draw the area of said web around said deposits out of the normal plane thereof; and roll coating the other said layer as a slurry, on the other said face of said web at said coating nip, while said suction roll is drawing the area of said web surrounding said one layer out of the plane of said web at said nip;

and then drying said other layer;

whereby no deposit is made on said surrounding area and deposit is made only on the face of said web opposite said one layer deposit to exactly register therewith.

10. The method of exactly registering electrode deposits on one face of a web with spaced dried electrode deposits on the other face of the web by means of a nip formed by a coating roll and a suction roll which comprises the steps of;

forming a plurality of individual and successive solidified electrode deposits on one face of said web and advancing said web through said nip with said solidified deposits supported on said suction roll;

exerting suction through the surface of said suction roll to draw the portions of said web around said solidified deposits out of the normal plane of said web and away from the surface of said coating roll;

applying a slurry of the other said electrode on the other said face of said web in said nip while said suction is so exerted;

and then continuing the advance of said web through a drying zone to solidify and dry the electrode slurry so deposited on said web in said nip.

* * * * *